Figure 1:
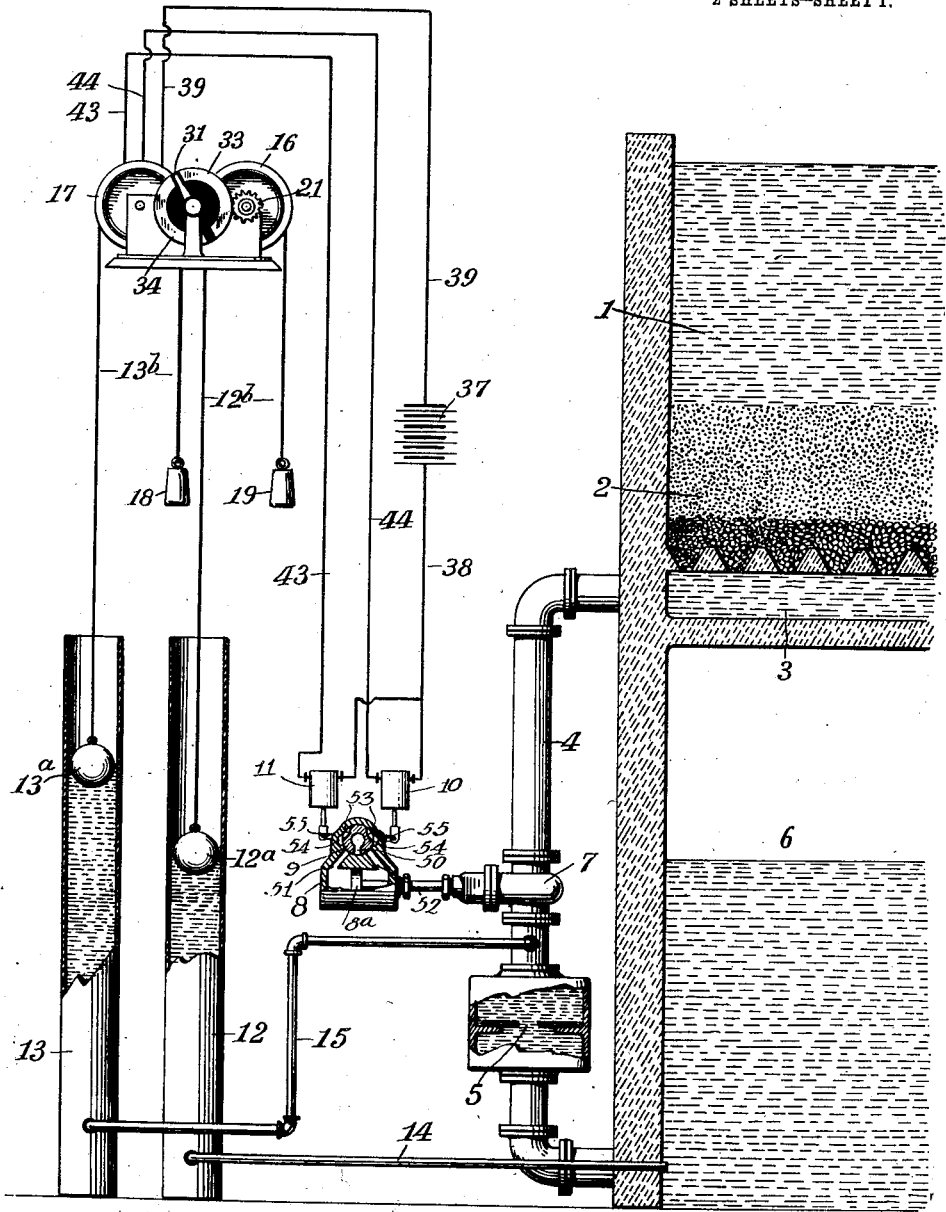

W. J. PIKE.
CONTROLLING DEVICE FOR FILTRATION PLANTS.
APPLICATION FILED SEPT. 29, 1913.

1,111,857.

Patented Sept. 29, 1914.
2 SHEETS—SHEET 2.

Witnesses
Harold O. Van Antwerp
Palmer A. Jones

Inventor
Walter J. Pike.
By Luther V. Moulton
Attorney

UNITED STATES PATENT OFFICE.

WALTER J. PIKE, OF GRAND RAPIDS, MICHIGAN.

CONTROLLING DEVICE FOR FILTRATION PLANTS.

1,111,857.  Specification of Letters Patent.  Patented Sept. 29, 1914.

Application filed September 29, 1913. Serial No. 792,519.

*To all whom it may concern:*

Be it known that I, WALTER J. PIKE, a citizen of the United States of America, residing at Grand Rapids, in the county of Kent and State of Michigan, have invented certain new and useful Improvements in Controlling Devices for Filtration Plants; and I do hereby declare the following to be a full, clear, and exact description of the invention, such as will enable others skilled in the art to which it appertains to make and use the same.

My invention relates to controlling devices for fluids, and more especially for controlling the flow in filtration plants, and the invention relates particularly to the mechanism for controlling the electrical current for a magnetically controlled valve which valve controls the flow of water from the filter, and its object is to provide a device which is simple in construction, automatic, effective and accurate in operation, and to provide the same with various new and useful features hereinafter more fully described and particularly pointed out in the claims.

In the style of filtration plant for which this device is particularly adapted, the water is filtered through a bed of sand and gravel which is periodically washed or cleaned by reversing the flow of water therethrough. When the filter is freshly cleaned the water has a tendency to pass through it quite rapidly if not restrained, and after the bed has become partially clogged with impurities from the water it will pass less easily therethrough, and thus the discharge of water varies, depending upon the condition of the filter bed.

It has been found by experiment that the best results can be obtained from the filter by regulating the flow of water therethrough so that it will not exceed a certain maximum flow at any time. This has been accomplished by automatic means, comprising a restricted passage or orifice in the drain pipe from the filter to the clear water reservoir or what is technically known as the "clear well", this orifice being preferably adjustable and adapted to permit the required amount of water to pass therethrough in a given length of time and under a certain pressure, and limiting the pressure above the orifice so that it will not exceed such pressure. With the object in view of automatically limiting this pressure above the orifice, I provide a gate valve in the pipe, this valve being actuated by a piston, the hydraulic pressure on which is governed by electro-magnets adapted to control the pressure at the respective sides of a piston operating to open or close the valve. It is necessary to automatically shift the electrical currents to respectively excite the said magnets and this current must be governed both in respect to the varying height of the water level in the clear well, and the varying pressure above the orifice, and must also be adapted to cause the valve to be completely closed when the level in the clear well has risen to a maximum.

My present invention provides an improved device to accomplish the above purposes, the preferred construction and arrangement of which will appear by reference to the accompanying drawings, in which:—

Figure 2:
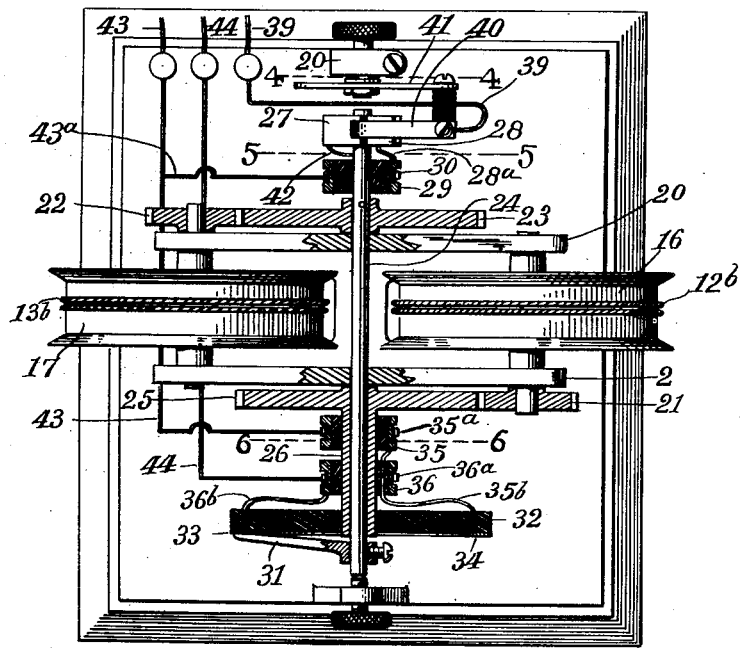
Figure 4:
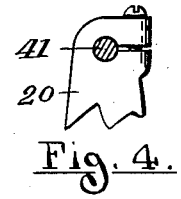
Figure 5:
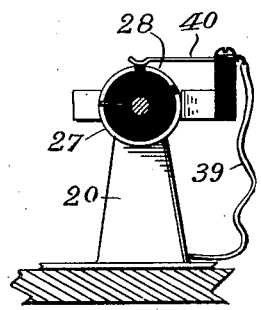
Figure 3:
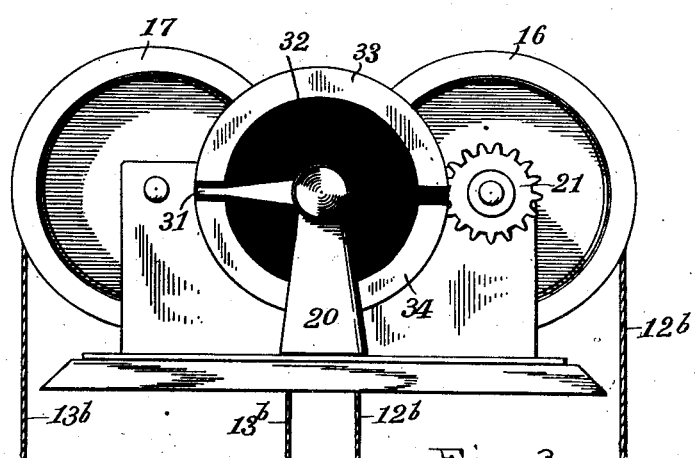
Figure 6:
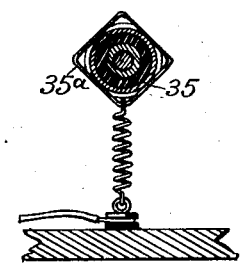

Figure 1 is an elevation representing a portion of a filtration plant provided with a controlling device embodying my invention: Fig. 2 is a plan view partially in section of the electric current controlling mechanism; Fig. 3 is an end elevation of the same; Fig. 4 is a section on the line 4—4 of Fig. 2; Fig. 5 is a section on the line 5—5 of Fig. 2; and Fig. 6 is a section on the line 6—6 of Fig. 2.

Like numbers refer to like parts in all of the figures.

1 represents the filter in which is a sand and gravel filter bed 2, and a collecting passage 3, with which passage the effluent pipe or passage 4 communicates. An adjustable orifice 5 in this passage restricts the flow therethrough and the passage thence opens into the clear water reservoir, or clear well 6. A gate valve 7 is provided in the passage above the orifice 5 and this gate valve is operated by a piston 8ª in the cylinder 8. The pressure for operating this piston is controlled by a magnetically operated valve of any convenient type. In the valve shown the said pressure, which is obtained from any convenient source, is admitted to the central opening of an oscillatory valve 9. This central chamber is provided with an outlet 50 adapted to alternately communicate, as the valve is rocked in either direction, with the ports 51 and 52 which communicate respectively with opposite ends of the cylinder 8, thereby directing the pressure to opposite sides of the piston 8ª to open or close the valve 7. The valve 9 is also provided with exhaust chambers 53, which are so located that when the valve is rocked to a position where the passage 50 will communicate with either the port 51 or 52, one of the chambers will communicate with the opposite passage, permitting the outflow of fluid from the opposite end of the cylinder through the exhaust passages 54 in the valve body.

A lever 55 is connected to the outside end of the valve 9 by which it may be oscillated and the magnets 10 and 11 are connected to opposite ends of said lever to actuate the same. These magnets will be designated as the opening magnet 10 and closing magnet 11, as their respective functions, when excited, are to shift the valve to direct the pressure to open or close the valve 7.

It will be understood that the mechanism for opening and closing the valve 7, above described, forms no part of this invention. My electric current controlling mechanism will operate in connection with any like apparatus which has magnets to control the means for opening and closing of a valve and conducting wires leading to the magnet coils. My device relates to automatic control of the electric circuits by changes of water levels in the apparatus. For this purpose two float chambers or stand pipes 12 and 13 are provided, open at their upper ends. The chamber 12 is in direct communication with the clear well through the pipe 14 and the water level therein is at all times the same as in the said well. The chamber 13 communicates through the pipe 15 with the passage 4 above the orifice 5, and the level in this chamber is always equal to the level in the clear well plus an amount due to the pressure or "head", in the passage immediately above the orifice. If a uniform pressure above the orifice is maintained the difference between the water levels in the two chambers 12 and 13 will remain equal irrespective of the height to which they both may rise, and the flow through the orifice will be constant in quantity and at the maximum, until the clear well fills to a level which is lower than the maximum capacity of said well a distance equal to the difference in levels in the float chambers, and thereafter the pressure, the flow, and difference in levels in said float chambers gradually decrease to none of each, when the clear well is filled to the limit. Within chambers 12 and 13 are the respective floats 12ᵃ and 13ᵃ, which rise and fall with the changes of water level in each respective chamber. Cords 12ᵇ and 13ᵇ are attached to these floats at one end, thence extend upward and are wound about the respective drums 16 and 17, and to their other ends have attached the respective counter weights 18 and 19. The drums 16 and 17 are each fixed on a shaft journaled in the frame 20, and the shafts provided with respective pinions 21 and 22. The pinion 21, rotated by the drum 16, engages a gear 25 to rotate the sleeve 26, journaled on the shaft 24, and the pinion 22 rotated by the drum 17 meshes with a gear 23 on a shaft 24 to rotate the shaft. An insulated drum is fixed on the shaft 24 and provided on its periphery with conducting contact segments 27 and 28, the segment 28 is comparatively short, and the segment 27 extends over the greater portion of the circumference of the drum, and these segments are spaced apart by insulating material. On the shaft 24 is mounted an insulated collecting ring 29 engaged by a brush 30, said brush being of any convenient form, the peculiar type illustrated in Fig. 6 being used on this device.

The end of the shaft 24 projects through the sleeve 26 and carries a contact arm 31, and on the end of the said sleeve 26 is fixed a disk 32 of non-conducting material provided with two equal contact segments 33 and 34, having their ends spaced apart and each of which extends through nearly one-half of the circuit of the disk. These contact segments are separately engaged by the contact arm 31 and are designated as the opening segment 33 and the closing segment 34. On the sleeve 26 are mounted two collecting rings 35 and 36 insulated from the sleeve and engaged by brushes 35ᵃ and 36ᵃ. The ring 36 is connected by the conductor 36ᵇ to the opening segment 33, and the ring 35 is connected to the closing segment 34 by the conductor 35ᵇ.

The current for exciting the magnets 10 and 11 may be derived from any convenient source, such as a battery 37, one of the poles of which is connected to each magnet coil by the conductor 38, and the other pole of the battery connected by the conductor 39 to a brush 40 mounted on an adjustable arm 41 and the brush alternately engages the segments 27 and 28 as the shaft 24 is rotated by a rise or fall of the float 13ᵃ. The segment 27 is electrically connected to the shaft 24 by the conductor 42 and through said shaft to the contact arm 31.

The coil for the magnet 11 is connected at one side to the battery by the conductor 38 and at the other side is connected by the conductor 43 to the brush 35ᵃ and thence through the collecting ring 35 and conductor 35ᵇ to the closing segment 34. This conductor 43 also has a branch 43ᵃ connected to the brush 30 on the collecting ring 29 and this ring is connected by the conductor 28ᵃ with the short segment 28, which is sometimes engaged by the brush 40.

The coil for the magnet 10 is connected at one side to the battery by the conductor 38 and at the other side is connected by the conductor 44 to the brush 36ᵃ and thence through the ring 36 and conductor 36ᵇ to the opening segment 33.

The operation of this device is as follows:—The restricted passage 5 will cause the pressure between the same and the valve 7 to be greater than that due to the level of the water in the well 6. This will cause the water in the float chamber 13 to rise above said level, raising the float which will rotate the shaft 24 and parts attached. As long as the arm 31 is on the segment 33, the opening circuit is closed and the valve 7 will be opened by the excitation of the coil of the magnet 10 which directs the pressure to the opening side of the piston in the cylinder 8. When the arm 31 moves into contact with the segment 34 the electric current is then shifted to the coil of the closing magnet 11, which then directs the pressure to the opposite side of the piston in the cylinder 8 and closes the valve. There is thus a constant tendency to maintain such a level of water in the chamber 13 as will keep the arm 31 intermediate the segments as shown in Fig. 3 and thus to maintain a constant level of the water in the chamber 13. The segment 33, however, being mounted on a rotative disk 32 which is adjusted by means of the float 12$^a$ in the chamber 12, the position of this neutral point between the segments is shifted in accordance with the quantity of water in the clear well 6, the level of the water in the chamber 12, being always the same as in the said well. As the float 12$^a$ rises and falls it causes the sleeve carrying the disk 32 to be rotated in the same direction as the arm 31, and thus as the water rises in the chamber 12 it permits the corresponding rise of water in the chamber 13 before the valve would be closed as described. If, however, the water in the chamber 13 rises to the maximum, for which the mechanism is adjusted, the segment 27 will be carried away from under the brush 40 and the segment 28 brought in contact therewith. This cuts off the circuit through the arm 31, closes the circuit through the branch conductor 43$^a$, and thus excites the coil of the magnet 11 causing the valve to close, regardless of the position of the segment 34. There is thus a limit to the rise of the water in both of the said chambers whenever the maximum quantity of water is in the clear well 6, and it will also be noted that when there is less than this quantity of water in the same that any change of difference in the levels of the water in the chambers 12 and 13 will at once be readjusted, and thus a constant differential pressure maintained between the valve 7 and the orifice 5 at all times, thus limiting the flow to a certain pre-determined amount until the maximum level is reached in the chamber 13, whereupon the operation changes, as follows:—As soon as the float 13$^a$ shifts the circuit to the closing magnet coil, and the valve begins to close, it will reduce the difference between the valve opening and the opening of the orifice. This reduces the pressure therebetween and consequently lowers the differential of the levels in the chambers 12 and 13; this tends to produce a fall of level in the chamber 13, which results in a rise in the chamber 12. (Suppose this difference to have been two feet with the valve wide open and the maximum flow with the float 13$^a$ below the closing level). The result will be, that there will be established a differential of less than two feet, depending on how rapidly the water is taken out of the clear well, and this differential and flow will be constantly and automatically re-adjusted strictly in accord with the demands made on the clear well at all rates below the maximum flow permitted from the filter to the same. The slower the drain on the clear well the less will be the differential, and the slower the flow from the filter.

I am thus able, under all the different conditions of the operation of the filtration tank, whether rapid or slow, and of the quantity of water in the clear well, whether great or small, to maintain a maximum limit to the flow from the filter to the clear well, and to automatically control the flow to the required amount when less than the maximum, the entire device being automatic in operation and requiring no further attention after being once properly adjusted.

I have described my device in connection with a filter plant, but obviously it may be used in various other relations, as for instance, to apportion the flow of a liquid to that of another liquid of variable flow.

What I claim is:—

1. A controlling device, comprising a passage having a restricted orifice, a valve at the pressure side of said orifice, means for opening and closing said valve, separate electric circuits to control the opening and closing means, an arm and a circuit closer simultaneously rotative, a float to rotate the same and operating the closer when the float rises to the limit, rotary segments in circuit with the respective controlling circuits and alternately engaged by the arm, and a separate float to rotate the segments.

2. A controlling device, comprising a passage having a restricted orifice, a valve at the pressure side of said orifice, means for opening and closing said valve, separate electric circuits to control the opening and closing means, a float carried by fluid the level of which is determined by the pressure between the valve and orifice and adapted to close the closing circuit when the said level reaches the maximum, and a float carried by fluid the level of which is determined by the pressure below said orifice and adapted to shift said circuits as the pressure changes.

3. A controlling device, comprising a passage having a restricted orifice, a valve in the passage above said orifice, means for opening and closing said valve, electric circuits for controlling said means, a rotary shaft carrying a rotary circuit closer adapted to shift the current from the arm to the closing circuit, a float to rotate said shaft carried on fluid raised and lowered by the pressure between the orifice and the valve, rotary segments in the respective opening and closing circuits and alternately engaged by the rotary arm, and a float to rotate said segments carried on fluid raised and lowered by the pressure below said orifice.

4. A controlling device, comprising a passage having a restricted orifice, a valve in the passage above said orifice, means for opening and closing said valve, separate electric circuits for controlling said means, a rotary shaft, an arm and a rotary circuit closer on said shaft and electrically connected, said closer adapted to shift the circuit from the arm to the closing circuit, a float to rotate said shaft and shift the circuit when said float rises to a maximum, an insulated disk rotative on the shaft and carrying segments arranged in the respective circuits and alternately engaged by the arm to close said circuits, and a second float to rotate said disk, the difference in the levels of said floats being determined by the difference in pressures at the respective sides of said orifice.

5. In combination with a filtration plant having a restricted orifice between the filter and the clear well, a valve at the pressure side of said orifice, electromagnets to control the opening and closing of said valve, a rotatable contact arm, a rotatable disk having segments adapted to be separately engaged by said arm, a source of electricity in communication with the coils of said magnets and with the said contact arm, electric conductors from the said segments to the respective magnets, and separate means actuated by the respective pressures above and below the said orifice for independently rotating the contact arm and the disk.

6. In combination with a filtration plant having a passage provided with a restricted orifice between the filter and the clear well, a valve in the passage on the pressure side of the orifice, means for opening and closing said valve and electromagnets to control said means: of an electrical current controlling mechanism, comprising a rotatable contact arm, a rotatable disk having segments adapted to be separately engaged by said arm, separate means for independently rotating said disk and arm actuated by the respective pressures above and below the orifice, a source of electrical current in constant communication with the coils of the magnets and also with the said contact arm when the water level in the clear well is below maximum, a closing segment rotating with the said arm and adapted to close the closing circuit when the said water level reaches maximum, an electrical conductor communicating with the coil of the closing magnet and with the said closing segment and also communicating with one of the segments on the disk, and an electrical conductor communicating with the opening magnet and with the other segment on the disk.

7. In combination with a controlling device having a passage with a restricted orifice and communicating with a reservoir and a magnetically controlled valve in the passage on the pressure side of said orifice; an electric current controlling device, comprising a shaft, a contact arm and a drum on the shaft, a long segment electrically connected to the shaft and a short segment insulated from the shaft, a disk rotative upon the shaft contiguous to the contact arm, a closing and an opening segment on the disk separately engaged by said arm, means actuated by the varying height of water in the reservoir to rotate the disk, means actuated by the varying pressure at the pressure side of the orifice for independently rotating the said shaft, a source of electric current in constant communication with the coil of both the opening and closing magnets for controlling said valve, a brush adjustable about the axis of said shaft and adapted to engage the long segment thereon during the time when the water level in the reservoir is below maximum and to engage the said short segment on the shaft when the water level reaches maximum, an electrical conductor communicating with the brush and with the source of current, an electrical conductor communicating with the closing segment on the disk and with the coil of the closing magnet and an electrical conductor communicating with the opening segment on the disk and with the coil of the opening magnet.

8. In combination with a controlling device having a passage with a restricted orifice and communicating with a reservoir, a valve in the passage on the pressure side of the orifice, and magnets to control the opening and closing of the valve; of an electric current shifting device comprising a float chamber in direct communication with the reservoir, a float in said chamber, a float chamber in direct communication with the passage between the valve and the orifice, a float in said chamber, two rotatable drums, a cord attached to each of said floats and wound about each respective drum, a contact arm rotated by the drum actuated by the first named float, a disk rotated by the drum actuated by the last named float, an opening and closing segment on the disk separately engaged by the contact arm, a source of electric current in constant communication with the coils of both the opening and closing magnet, and electrical conductors communicating with the said segments on the disk and with the coils of the respective magnets.

9. In combination with a pressure controlling system having a passage with a restricted orifice and opening into a reservoir, a valve in the passage at the pressure side of the orifice, and separate magnets to control the opening and closing of the valve; of an electric current controlling device comprising a float chamber in direct communication with the passage between the valve and orifice, a float in said chamber, a float chamber in communication with the reservoir, a float in said chamber, two rotatable drums, a cord attached to each float and wound about each respective drum, a shaft rotated by the movement of the first named float, a contact arm extending radially from the shaft, a long segment mounted on the shaft and electrically connected thereto, a short segment on the shaft and insulated therefrom, a brush adjustable concentric with the shaft and engaging the long segment while the water level in the first named chamber is below maximum, and engaging the short segment when the water rises above maximum, a disk concentric with the shaft rotated by the movement of the last named float, an opening segment and a closing segment on said disk separately engaged by said contact arm, a source of electric current in constant communication with the coils of both the opening and closing magnets, and with said brush, an electrical conductor communicating with the coil of the closing magnet, and with both the short segment on the shaft and the closing segment on the disk, and an electrical conductor communicating with the coil of the opening magnet and with the opening segment on the disk.

In testimony whereof I affix my signature in presence of two witnesses.

WALTER J. PIKE.

Witnesses:
HAROLD O. VAN ANTWERP,
MAE RANKIN.